United States Patent [19]
Bell

[11] Patent Number: 5,916,611
[45] Date of Patent: Jun. 29, 1999

[54] EDIBLE FOOD CONTAINER AND METHOD FOR MAKING EDIBLE PRODUCT

[76] Inventor: Burt J. Bell, P. O. Box 536, Winter Park, Fla. 32790

[21] Appl. No.: 08/971,351

[22] Filed: Nov. 17, 1997

[51] Int. Cl.⁶ .................................................. A23G 9/00
[52] U.S. Cl. ........................ 426/95; 426/138; 426/139; 426/282; 426/283; 426/391; 206/503; 206/505; 206/518; 220/669; 220/671; D1/116
[58] Field of Search ................................ 426/94, 95, 100, 426/101, 106, 112, 115, 138, 139, 391, 393, 282–283; 206/438, 503, 505, 509, 518; 220/532, 669, 671, 4.27; D1/101, 105, 116; D112/407

[56] References Cited

U.S. PATENT DOCUMENTS

| | | | |
|---|---|---|---|
| D. 358,018 | 5/1995 | Lindemann | D1/101 |
| D. 386,885 | 12/1997 | Bell | D1/116 |
| 2,462,497 | 2/1949 | Heyman | 426/139 |
| 3,835,994 | 9/1974 | Davis et al. | 206/499 |
| 4,444,795 | 4/1984 | Weinstein | 426/90 |
| 4,855,150 | 8/1989 | Mathes et al. | 426/87 |
| 4,927,656 | 5/1990 | Ito | 426/549 |
| 4,929,457 | 5/1990 | Sato | 426/139 |
| 4,931,301 | 6/1990 | Giuseppe | 426/505 |
| 5,072,832 | 12/1991 | Valentine et al. | 206/570 |
| 5,223,286 | 6/1993 | Selbak | 426/94 |
| 5,284,672 | 2/1994 | Ito | 426/549 |

FOREIGN PATENT DOCUMENTS

| | | | |
|---|---|---|---|
| 3130-578 | 3/1983 | Germany | 206/503 |

*Primary Examiner*—David Lacey
*Assistant Examiner*—Sherry Dauerman
*Attorney, Agent, or Firm*—William M. Hobby, III

[57] ABSTRACT

An edible food container has a hollow body having an interior wall and an exterior wall and having a generally flat bottom portion and an open top. The body has a concave curve side opposite to the convex side and has at least one elongated groove on the interior wall extending from adjacent the bottom portion to the body open top so that an edible container can be filled with a fluid material for later freezing and a plurality of containers can be nested together for dispensing from a vending machine. A method of making a frozen edible product includes selecting the edible container apparatus, filling the selected container with an edible fluid while allowing air to escape through the groove on the interior wall of the container, and freezing the edible fluid material in the edible container to provide an edible frozen product, such as ice cream and the like, which can be nested for dispensing from a vending machine or the like.

11 Claims, 2 Drawing Sheets

EDIBLE FOOD CONTAINER AND METHOD FOR MAKING EDIBLE PRODUCT

BACKGROUND OF THE INVENTION

The present invention relates to an edible food container and to a process of making a frozen edible product and especially to a process and container for frozen ice cream yogurt and the like.

In the past, frozen or partially frozen products, such as ice cream, yogurt, ices, and sherbets, have been frequently served in edible containers, such as cones. The edible cones typically are in the shape of a hollow cone but some cones have been provided with a flat bottom. The cones frequently have waffling on the exterior side thereof and are typically made using heated platens or dies to cook a batter applied thereto. The batter is generally made using a wheat flour along with an oil, sugar, water and sometimes egg. Once the cones have been cooked, they are fragile and easily broken so they must be packaged in a manner to avoid breakage. Prior cones have worked well in the industry providing an easy hand grip for holding the cone and a convenient large opening for dispensing a semi-frozen ice cream or yogurt thereinto or for the placing of a scoop of frozen ice cream on the top thereof. The cones have the disadvantage of not being able to sit on a flat surface even though cones have been devised which have a flat bottom and provide an easier support. The cones have also had the disadvantage of being difficult to dispense from vending machines. It has been suggested to have an ice cream vending machine which dispenses a cone and then fills the cone and also to dispense a cone prefilled with an ice cream product. Prefilled cones are typically packaged in a package to prevent damage in dispensing of the cone.

The present invention is directed towards an edible container, such as an ice cream or yogurt container, which can be easily filled with a semi-frozen product and frozen for dispensing from a vending machine but which provides a convenient flat bottom which is more stable than a truncated cone-type ice cream cone.

Prior U.S. patents directed towards ice cream cones and the like include the U.S. Patent to Davis et al., U.S. Pat. No. 3,835,994, for a cone package which is a package for ice cream cones including a pair of generally rectangular complementary panels made of an expanded foam plastic material with each panel having a pocket which corresponds in shape to the shape of a number of nested ice cream cones. In the patent to Weinstein, U.S. Pat. No. 4,444,795, a frozen confection and packaging module includes a serving kit and package for confections and includes an unfilled ice cream cone nested in the bottom of a shaped conical jacket which is scored for separation along an annular line located below the rim of the ice cream cone. The upper end of the cone jacket is shaped to receive a snap-on lid. In the Selbak patent, U.S. Pat. No. 5,223,286, an edible handheld food product is provided which may be used as a container for ice cream or other frozen confections. It is formed from a shell of baked cookie dough. In the Sato patent, U.S. Pat. No. 4,929,457, an ice cream cone is disclosed which comprises a holding part, a gripping part, and at least two vertical wall surface parts of the shape of an inverted triangle. In the patent to Ito, U.S. Pat. No. 4,927,656, a heated food base is formed by heating a batter which is obtained by kneading wheat flour and oil, sugar, water, and an edible surfactant, such as egg, which is poured onto a heating plate and spread thereon for making a cone-type edible vessels. The Ito patent, U.S. Pat. No. 5,284,672, is a method for producing an edible container, such as a cone, cup, or dish, for a frozen confection, such as ice cream, and in which the edible container is in the shape of a waffle cone. In the Giuseppe patent, U.S. Pat. No. 4,931,301, a process for producing different shaped waffle products and especially conical ice cream cones includes introducing batter between dies and counter dies having a high thermal conductivity in cooking the batter thereon. The Mathes et al. patent, U.S. Pat. No. 4,855,150, is for an ice cream cone having an imprinted band.

The present edible food container is also a waffle cone-type product which is shaped for being filled with a frozen ice cream or the like which, and when placed in a vending machine, supports itself with a flat bottom and in a nested arrangement with a concave curved side of one container nested in a convex curved side of the next container such that as each front container in a line is dispensed. The other nested containers tend to maintain themselves in a dispensing line.

SUMMARY OF THE INVENTION

An edible food container has a hollow body having an interior wall and an exterior wall and having a generally flat bottom portion and an open top. The body has a concave curved side opposite to the convex side and has at least one elongated groove on the interior wall extending from adjacent the bottom portion to the body open top so that an edible container can be filled with a fluid material for later freezing. A plurality of containers can be nested together for dispensing from a vending machine. A method of making a frozen edible product includes selecting the edible container apparatus, filling the selected container with an edible fluid while allowing air to escape through the groove on the interior wall of the container, and freezing the edible fluid material in the edible container to provide an edible frozen product, such as ice cream and the like, which can be nested for dispensing from a vending machine or the like.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
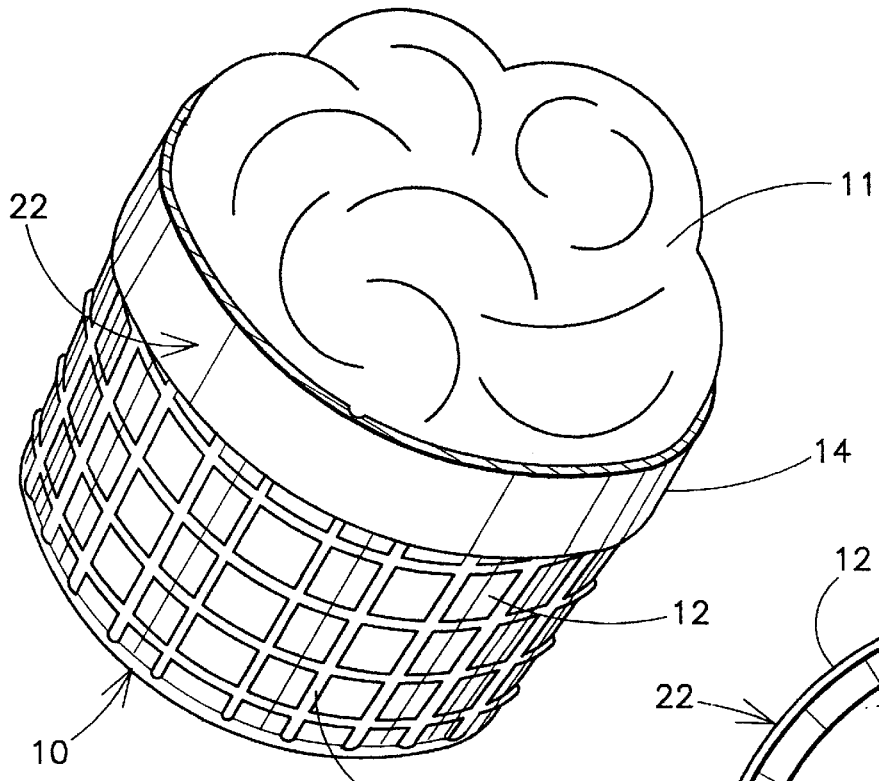
FIG. 1 is a perspective view of an edible food container in accordance with the present invention filled with an edible food product.
Figure 3:
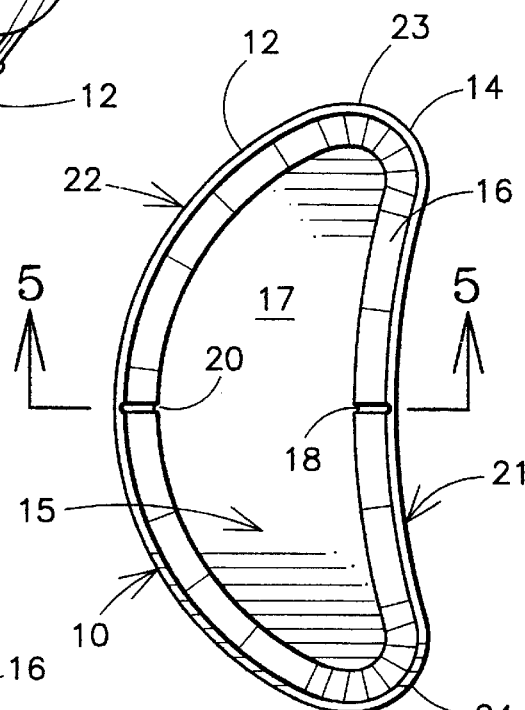
FIG. 3 is a top elevation of the edible food container of FIGS. 1 and 2.
Figure 2:
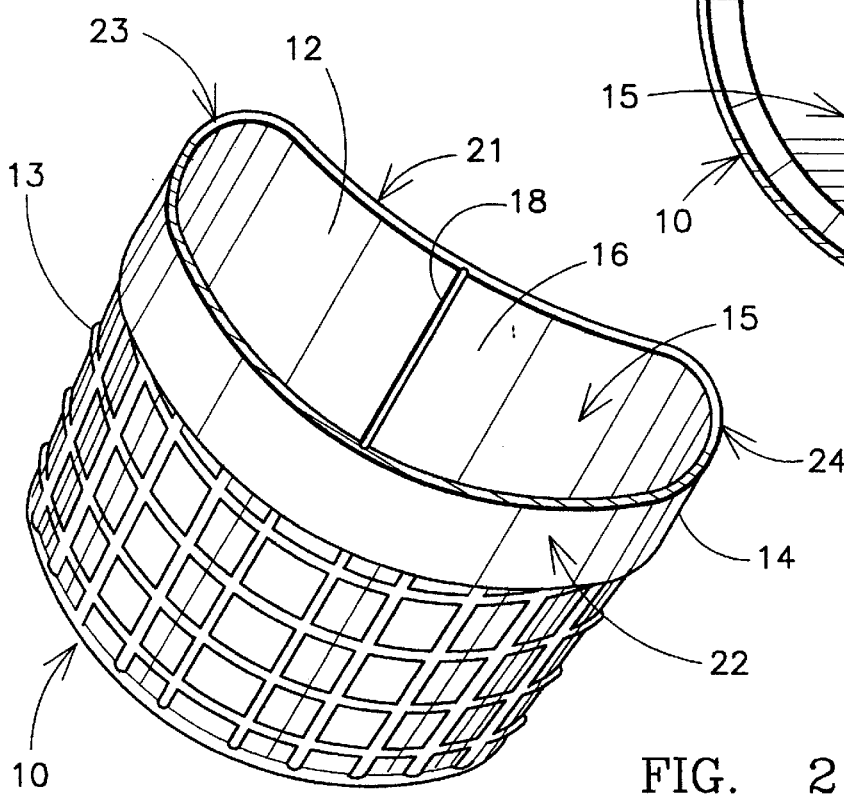
FIG. 2 is a perspective view of the edible food container of FIG. 1.
Figure 4:
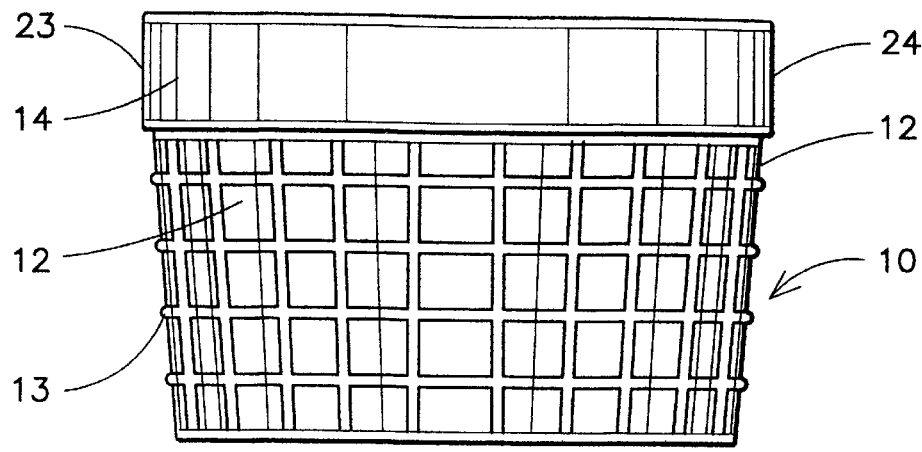
FIG. 4 is a side elevation of the containers of FIGS. 1–3.

Referring to the drawings and especially to FIGS. 1–5, an edible food container 10 is illustrated and is filled with an edible food product 11 in FIG. 1. The edible food product 10 is in the nature of a waffled cone product having a cone body 12 which may be made of any edible food product desired, such as conventional ice cream cone materials, made from a cooked batter having a wheat flour, sugar, oil, water and the like therein. The body 12 can be seen having a waffling surface 13 on the exterior thereof along with a reinforcing band 14 along the top thereof. The container 10 has an open top 15 with interior walls 16 and a flat bottom 17. The container 10 interior wall, as illustrated, has elongated grooves 18 and 20 on the interior walls thereof. The cone walls extend at a slight angle from the open top 15 to the flat bottom 17. The cone body has a concave curved surface 21 along one side thereof and a convex curved side 22 opposite to the concave side. The convex and concave sides are connected by generally U-shaped edges 23 and 24. The concave surface 21 is at a smaller angle than the convex curve 22 and by the nature of the angled sides in the flat bottom of the edible container. The edible container tends to form a generally rounded corner triangular shape for better support when the flat bottom 17 is placed on a flat surface.

Figure 5:
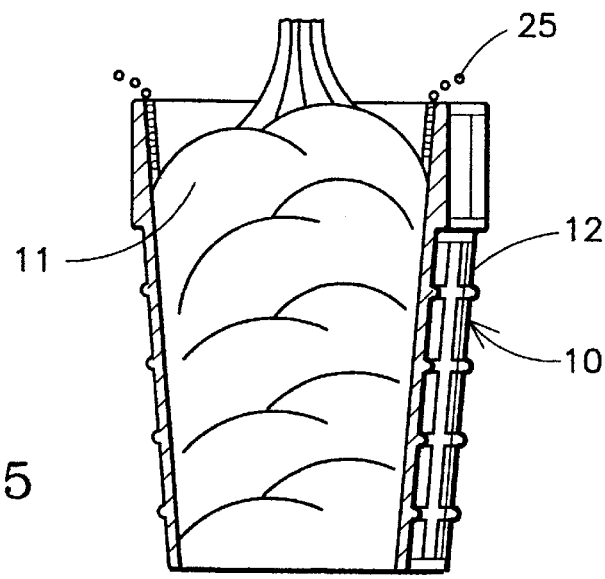
FIG. 5 is a sectional view taken on the line 5—5 of FIG. 3.
Figure 6:
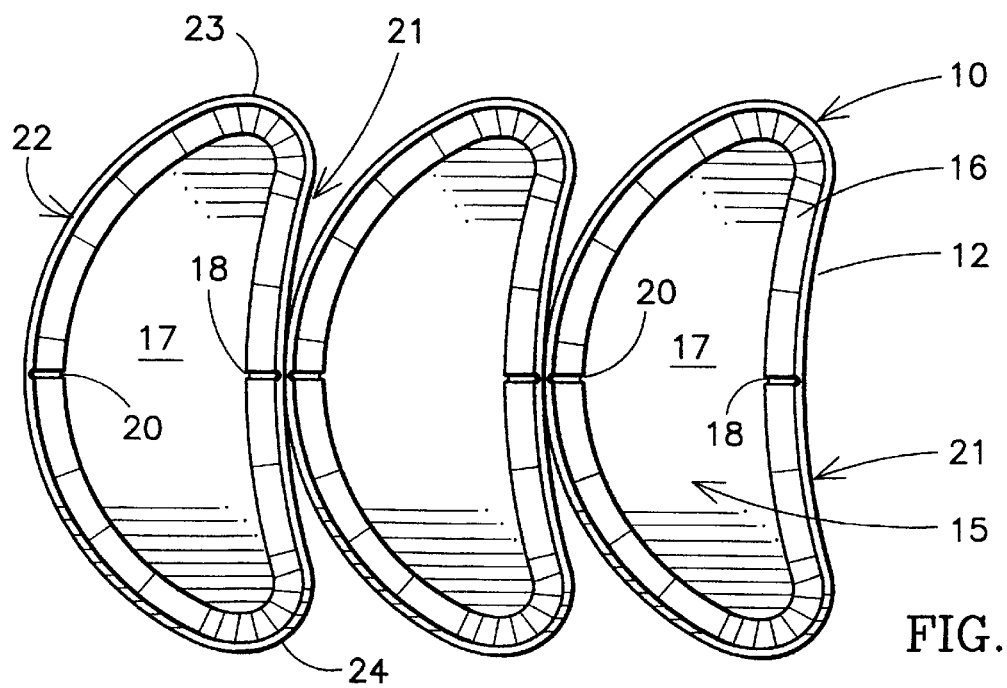
FIG. 6 is a top elevation of a plurality of food containers of FIGS. 1–5 nested together.

When the edible container 10 is filled with an edible food product 11, such as a semi-frozen ice cream or yogurt being filled into the cone in Figure 5, it tends to leave the groove 18 and 21 open so that air escapes from the bottom, as illustrated by the air bubble 25 in FIG. 5, so that air is not trapped in the bottom of the container being filled with a semi-frozen edible food material. The cones, however, are especially advantageous for dispensing from vending machines where they can be filled with an edible material 11 which can be frozen and then can be placed in a dispensing machine, as illustrated in FIG. 6, nested together and sliding on a flat surface with the flat bottoms. The nesting is with the convex side 22 nesting in the concave side 21 of the next adjacent container so that the containers tend to take less space than circular containers and tend to guide each other as they are being pushed along. As illustrated, the containers are made with a larger radius of curvature for the concave side 21 than for the convex side 22. This gives the more triangular shape which provides additional support for the cone when stood on a flat surface. At the same time, the two interacting curved surfaces tend to guide each container in a straight line as they are moved forward.

A process of making a frozen edible container includes the steps of selecting an edible food container, as illustrated in FIGS. 1–6, filling each selected container with an edible fluid material 11, as seen in FIG. 5, and freezing the edible food material 11 to form an edible food product shaped to be nested together, as shown in FIG. 6. The process includes placing a plurality of frozen edible products together, as seen in FIG. 6, which are stored nested together with one container convex curve side nested in another container convex side and in which the convex and concave sides are of different curvatures.

It should be clear at this time that an edible food container as well as a process of making a frozen edible product has been provided which provides greater support for the container placed on a flat surface and which provides an easier dispensing of a frozen food product. However, the present invention should not be construed as limited to the forms shown herein which are to be considered illustrative rather than restrictive.

I claim:

1. An edible food container comprising:
    an edible container having a hollow body having an interior wall and an exterior wall and having a generally flat bottom portion and an open top, said hollow body having a concave curved side and a convex curved side opposite said concave curved side, said body having at least one elongated groove in the interior wall extending from adjacent the bottom portion to adjacent the body open top whereby an eatable container can be filled with a fluid material and a plurality of containers can be nested together.

2. An edible food container according to claim 1 in which said at least one elongated groove comprises two of said elongated grooves in the interior wall thereof.

3. An edible food container according to claim 2 in which said edible container body exterior wall has a reinforced area around the said body open top thereof.

4. An edible food container according to claim 2 in which said edible container body is filled with a frozen edible material.

5. An edible food container according to claim 1 in which said edible container body has waffling on the exterior wall thereof.

6. An edible food container according to claim 1 in which a plurality of said edible container bodies are nested together with one container convex curved side nested in another container concave side.

7. A process of making a frozen edible product comprising the steps of:
    selecting an edible container having a hollow body having an interior wall and an exterior wall and having a generally flat bottom portion and an open top, said hollow body having a concave curved side and a convex curved side opposite said concave curved side, said body having at least one elongated groove in the inside wall extending from adjacent the interior bottom portion to adjacent the body open top;
    filling said selected container with an edible fluid material while allowing air to escape through said groove in the inside wall of said hollow body; and
    freezing said edible fluid material in said edible container whereby a frozen edible product is formed in which a plurality of edible frozen products can be nested together.

8. A process of making a frozen edible product in accordance with claim 7 in which said selected container body has a pair of elongated grooves in the interior wall thereof.

9. A process of making a frozen edible product in accordance with claim 8 in which said selected container body exterior side has waffling thereon.

10. A process of making a frozen edible product in accordance with claim 8 in which said selected container body exterior wall has a reinforced area around the open top thereof.

11. A process of making a frozen edible product in accordance with claim 8 in which a plurality of said frozen edible products are stored nested together with one container convex curved side nested in another container concave side.

* * * * *